(12) United States Patent
Bellis

(10) Patent No.: US 8,191,539 B2
(45) Date of Patent: Jun. 5, 2012

(54) WOUND HYDROCARBON TRAP

(75) Inventor: Andrew George Bellis, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 427 days.

(21) Appl. No.: 12/499,497

(22) Filed: Jul. 8, 2009

(65) Prior Publication Data

US 2010/0065030 A1 Mar. 18, 2010

Related U.S. Application Data

(60) Provisional application No. 61/098,213, filed on Sep. 18, 2008.

(51) Int. Cl.
| F02B 25/06 | (2006.01) |
| F02M 35/02 | (2006.01) |
| B01D 53/04 | (2006.01) |

(52) U.S. Cl. .................. 123/574; 123/198 E; 96/154

(58) Field of Classification Search ............... 123/198 E, 123/434, 516, 518, 519, 574; 96/134–136, 96/143, 151, 154
See application file for complete search history.

(56) References Cited

U.S. PATENT DOCUMENTS

| 3,665,906 A | 5/1972 | De Palma |
| 4,831,685 A | 5/1989 | Bosyj et al. |
| 5,154,735 A | 10/1992 | Dinsmore et al. |
| 5,962,820 A | 10/1999 | Lepoutre |
| 6,440,200 B1 | 8/2002 | Sakakibara et al. |
| 6,464,761 B1 * | 10/2002 | Bugli ............................. 96/135 |
| 6,592,655 B2 | 7/2003 | Iriyama et al. |
| 6,637,415 B2 | 10/2003 | Yoshioka et al. |
| 6,692,551 B2 | 2/2004 | Wernholm et al. |
| 6,698,403 B2 | 3/2004 | Honda et al. |
| 6,736,871 B1 | 5/2004 | Green et al. |
| 6,786,211 B2 | 9/2004 | Takeyama et al. |
| 6,817,345 B2 | 11/2004 | Lawrence |
| 6,886,538 B2 | 5/2005 | Lee et al. |
| 6,905,536 B2 | 6/2005 | Wright |
| 7,276,098 B2 | 10/2007 | Koslow |
| 7,288,223 B2 | 10/2007 | Becker et al. |
| 2002/0011050 A1 | 1/2002 | Hansen et al. |
| 2002/0081919 A1 * | 6/2002 | Muramatsu et al. ............ 440/88 |

(Continued)

FOREIGN PATENT DOCUMENTS

JP 56-148661 A 11/1981

OTHER PUBLICATIONS

Tschantz, M. et al., "Activated Carbon and the Control of Evaporated Emissions in Air Induction Systems," Sep. 29, 2003, MeadWestvaco Corp.—Carbon Dept., Covington, VA, 25 pages.

(Continued)

*Primary Examiner* — John Kwon
*Assistant Examiner* — Johnny Hoang
(74) *Attorney, Agent, or Firm* — Julia Voutyras; Alleman Hall McCoy Russell & Tuttle LLP

(57) ABSTRACT

An air induction system hydrocarbon trap is provided. In one example, the hydrocarbon trap includes an adsorber roll including an adsorbing material and a corrugate support, where the corrugate support is rolled with the adsorbing material to form a wound adsorber roll. A housing is further provided to retain the adsorber roll. A housing cap may be coupled to the housing.

20 Claims, 7 Drawing Sheets

U.S. PATENT DOCUMENTS

| | | |
|---|---|---|
| 2003/0192512 A1 | 10/2003 | Luley et al. |
| 2004/0099253 A1 | 5/2004 | Tschantz |
| 2005/0145224 A1* | 7/2005 | Zulauf et al. .................. 123/518 |
| 2006/0162704 A1 | 7/2006 | Hagler et al. |
| 2006/0185651 A1 | 8/2006 | Hagler |
| 2007/0107705 A1* | 5/2007 | Hoke et al. ............... 123/568.11 |
| 2007/0246023 A1 | 10/2007 | Saito |
| 2007/0278034 A1 | 12/2007 | Yamaura et al. |
| 2008/0053050 A1* | 3/2008 | Arruda et al. .................. 55/524 |
| 2008/0127949 A1* | 6/2008 | Herald et al. ................. 123/519 |
| 2008/0184891 A1* | 8/2008 | Zulauf et al. .................... 96/147 |

OTHER PUBLICATIONS

"Air Induction System Evaporative Emission Control Technologies", Nov. 2002, MeadWestvaco Corporation, Specialty Chemicals Division—Carbon Department, Covington, VA, 40 pages.

Tomlin, J. et al., "Engine Hydrocarbon Adsorber," U.S. Appl. No. 12/121,320, filed May 15, 2008, 26 pages.

Bellis, A.G. et al., "Sleeve Hydrocarbon Trap," U.S. Appl. No. 61/104,657, filed Oct. 10, 2008, 37 pages.

* cited by examiner

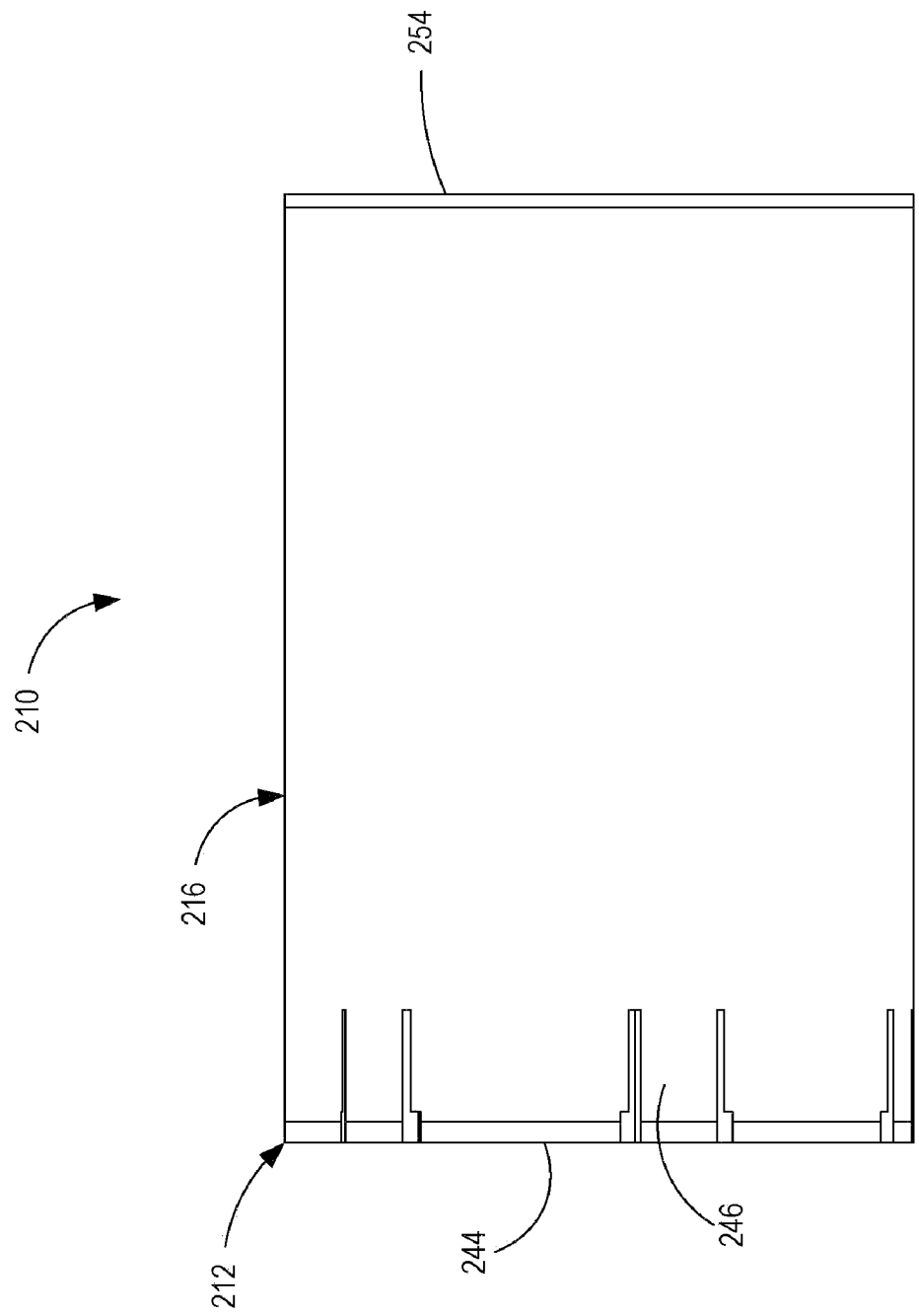

WOUND HYDROCARBON TRAP

CROSS REFERENCE TO RELATED APPLICATION

This application claims the benefit of U.S. Provisional Application 61/098,213, filed on Sep. 18, 2008, entitled WOUND HYDROCARBON TRAP, naming Andrew George Bellis as the inventor, the entirety of which is hereby incorporated herein by reference for all purposes.

FIELD

The present application relates to a device for capturing hydrocarbons emitted from a vehicle engine air induction system during engine off soaks.

BACKGROUND & SUMMARY

When an internal combustion engine is shut off, unburned hydrocarbon fuel vapors may be left in an intake manifold system, engine cylinders and/or an engine crankcase. These hydrocarbon fuel vapors may migrate out of the engine cylinders through an open intake valve into the intake manifold along with vapors that have migrated from a crankcase to the intake manifold through a PCV (Positive Crankcase Ventilation) system. The vapors in the intake manifold may also migrate past the throttle and into the fresh air intake system and then out into the surrounding atmosphere. Further, vapors may also migrate from a crankcase, through a crankcase fresh air hose, to the fresh air intake system and then out into the surrounding atmosphere. The migration of the hydrocarbon fuel vapors has been shown to be enhanced by the rising and falling temperatures of the engine during engine off soak which can be caused by rising and falling ambient temperatures or other like conditions.

It is known in the art to add an air induction system (AIS) hydrocarbon (HC) trap comprising one or more hydrocarbon adsorbing surfaces within the AIS to adsorb vaporized hydrocarbons during engine off soaks to prevent or reduce the release of such hydrocarbons into the environment. These AIS hydrocarbon traps may be purged of the temporarily adsorbed hydrocarbon vapors when the engine is restarted and the vapors may be consumed during normal engine combustion.

In one approach disclosed in U.S. Patent Application 2003/0192512, a hydrocarbon trap is shown as a metal structure which may be coated with an appropriate adsorber and comprised of cells or rings. In another approach disclosed in U.S. Pat. No. 6,905,536 a second AIS hydrocarbon trap may include rings pleated with angled or radiused folds, forming concentric or acentric cylinders within cylinders, with intermediate, inner and outer support members interceding between the rings. The ring material may adhere to itself along a mating edge to form a ring, and may further adhere to support members. In both approaches, one or more adsorbing surfaces may run parallel to the direction of an air flow axis, to define one or more adsorbing channels, disposed in a housing and/or coupled to a flange for installation.

The inventors herein have recognized various issues with such approaches. In some examples, the adsorbing channels defined in AIS hydrocarbon traps, such as the above described, may require different dimensions for different applications. For example, in some engines, the engine volume may be greater than in other engines, requiring a larger mass of air per engine cycle and larger adsorber channel openings. The prior AIS hydrocarbon traps are difficult to scale and without scalable adsorbing channel openings, the trap may impede an engine's ability to take in air and may result in engine efficiency being degraded. Further still, due to the construction and organization of a vehicle, there may be space limitations and size and material constraints on the AIS hydrocarbon trap. Increasing the density of cells or changing the pleat or ring dimension may not address the needs of a particular engine configuration or operating condition as current AIS hydrocarbon traps may not be easily altered to the requirements and dimensions of different systems.

As discussed above, the current AIS hydrocarbon traps may not be readily scalable or translatable across different applications and use in different operating conditions. For example, increasing a number of concentric or acentric cylinders within cylinders in an AIS hydrocarbon trap may increase the weight supported by pleats and intermediate members, leading to structural instability. Further, structural instability may change adsorber channel opening area, adsorbing surface, and adsorbing surface area in an undesired manner.

Further, current AIS hydrocarbon traps may couple the housing and the adsorbing material of the trap together using fasteners, screws, moldings, and/or adhesives. However, such fasteners and/or adhesives may breakdown over time resulting in the trap degrading and needing to be replaced. As an example, wear and tear due to vehicle operation may lead to degradation and deformation of the fasteners and/or adhesives and may cause a loss of functionality of the trap. When functionality is lost, AIS hydrocarbon traps may not meet full lifetime durability requirements and may need to be replaced. Further, loss of functionality may also lead to safety related issues due to parts of AIS hydrocarbon traps being ingested into the engine.

Accordingly, devices and methods are disclosed for an improved AIS hydrocarbon trap. In one example, the disclosed AIS hydrocarbon trap includes a trap housing enclosing an adsorber roll, where the adsorber roll includes a hydrocarbon adsorbing material, and a corrugate support rolled together. In some examples, the improved AIS hydrocarbon trap may be formed by rolling the corrugate support and adsorbing material into a wound adsorber roll and installing the roll in the trap housing. As such, in some examples, the AIS hydrocarbon trap may be spiral-shaped. The improved AIS hydrocarbon trap may have improved scalability, simplified construction, improved durability and a high level of adaptability for use in a variety of systems.

The disclosed AIS hydrocarbon trap may be a lightweight construction which may be easily adaptable and scalable. The AIS hydrocarbon trap's scalability allows optimization of cross sectional area, so that normal engine intake operations may not be inhibited while maintaining hydrocarbon trap effectiveness. Adsorber channel opening size and adsorbing surface area may be easily controlled with the AIS hydrocarbon trap construction such that it can be adapted to specific engine air flow and vaporized hydrocarbon adsorption requirements. For example, adsorbing material length and width may be controlled to enable a desired mass of air per engine cycle to move through adsorbing channels to the engine and for the AIS hydrocarbon trap to be employed in applications requiring differing adsorption surface area.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Further-more, the claimed subject matter is not limited to implementations that solve any disadvantages noted above or in any part of this disclosure.

BRIEF DESCRIPTION OF THE DRAWINGS

FIG. 7 shows a schematic diagram of an AIS hydrocarbon viewed in profile from the side.

DETAILED DESCRIPTION OF THE DRAWINGS

A wound AIS hydrocarbon trap and related methods and systems are described below. The wound AIS hydrocarbon trap may be integrated into an engine. An example engine is described and illustrated in regards to FIG. 1.

Figure 1:
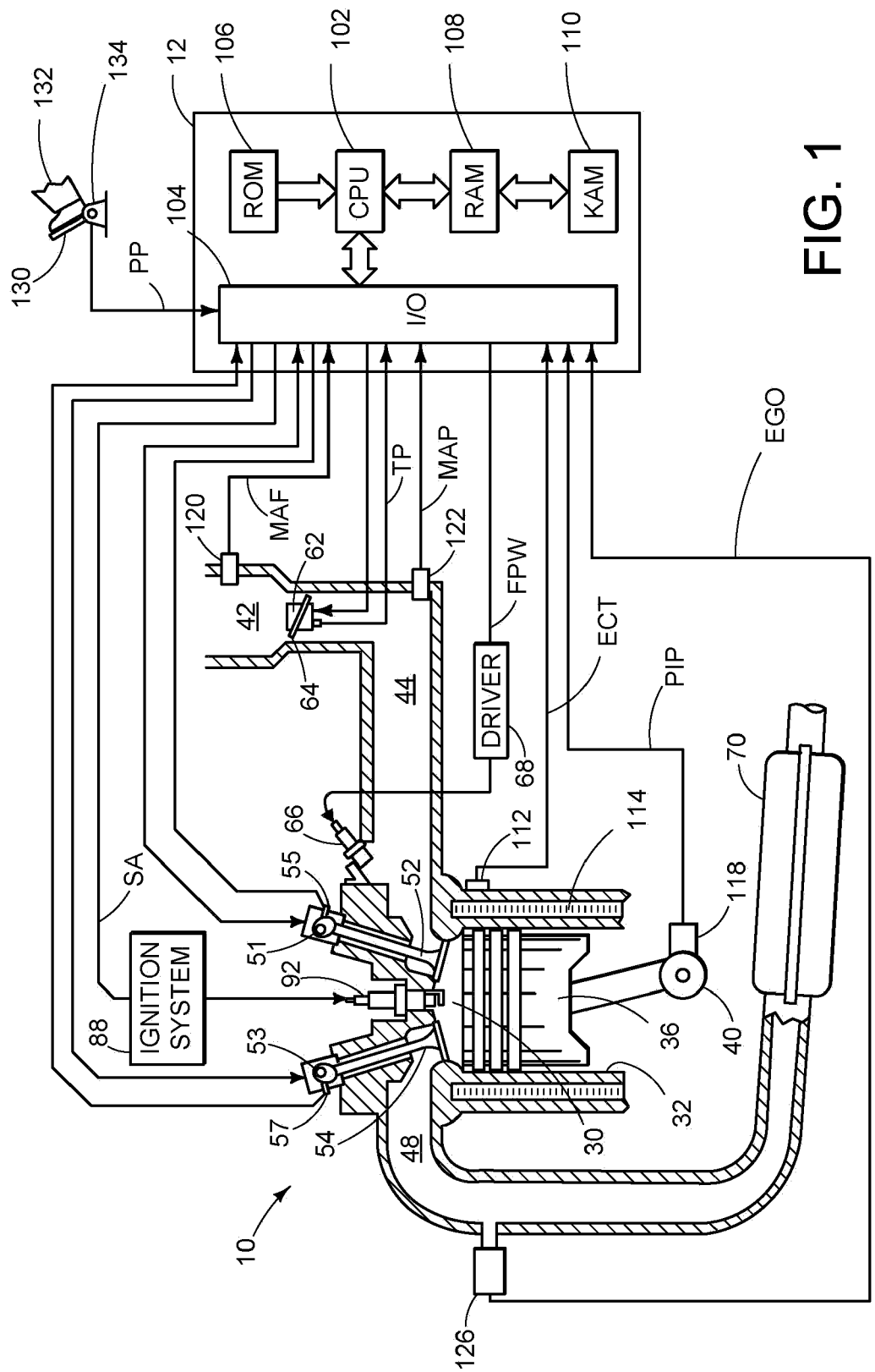
FIG. 1 shows a schematic depiction of an example engine system which may employ an AIS hydrocarbon trap.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. In further examples, the intake manifold may selectively communicate with a PCV (Positive Crankcase Ventilation) system via a PCV valve. The PCV system may allow combusted gases that leak or migrate into the crankcase as blow-by to be vented into the intake manifold, preventing possible engine damage.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12. In further examples, the intake passage 42 may be included as part of an air intake system which may feature an air filter and/or an AIS hydrocarbon trap.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type)

coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
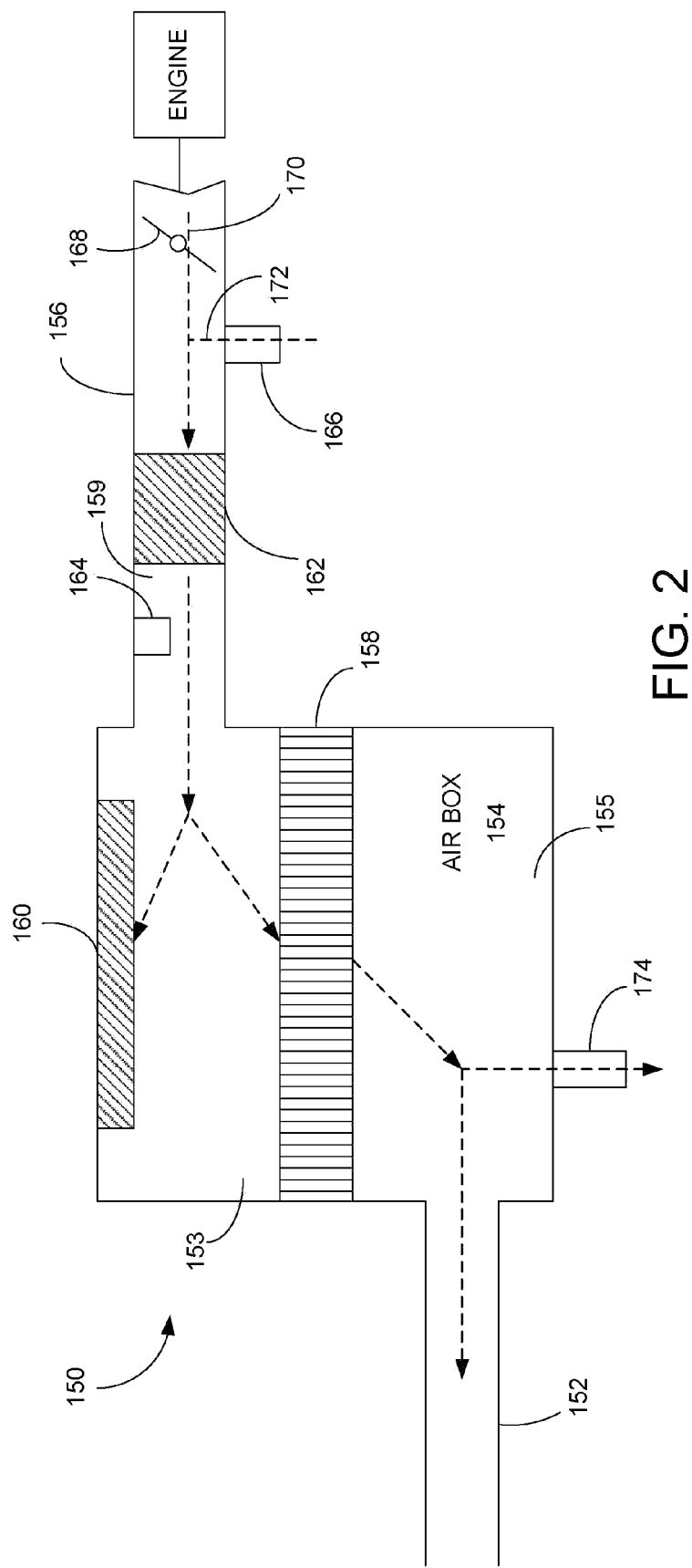
FIG. 2 shows a schematic illustration of an example AIS hydrocarbon trap included in an air intake system of an engine.

FIG. 2 provides a schematic illustration of an example air intake system 150 including a hydrocarbon trap. As described in more detail below, the disclosed hydrocarbon trap includes a trap housing enclosing an adsorber roll where the adsorber roll includes a hydrocarbon adsorbing material and a corrugate support rolled together to form a wound adsorber roll. As described in more detail below, as a lightweight, reduced-complexity trap, the disclosed trap is not vulnerable to the degradation which occurs as the various components and mechanical fasteners and adhesives wear down over time, such as through vehicle operation. As such, the disclosed hydrocarbon trap may have an extended product life, for example it may be useable as a trap for 15 years or 150 K engine life. Further, as described in more detail below, the trap may be tamper evident, and as a passive emissions control device, does not require OBD II monitoring.

As illustrated, the air intake system 150 may include a dirty air duct 152, an air box 154, and a clean air duct 156 to the engine. Air box 154 may include an air box cover 153 and an air box tray 155. An air filter 158 may be disposed in air box 154 along with one or more hydrocarbon traps, such as a bypass-trap hydrocarbon trap 160 and/or a flow-through trap 162. One or more sensors, such as mass air flow (MAF) sensor 164 may also be disposed in the air intake system. A PCV fresh air port 166 and t'body 168 may further be disposed in the air intake system. It should be appreciated that in addition to the above ports, the clean air duct may include additional ports, such as a break aspiration port, or a fuel vapor purging port, etc.

As used herein, a flow through trap is a trap where substantially all the vapors emanating from inside the engine during engine off soaks must pass before reaching the surrounding environment. A by pass trap is a trap in which only a portion of the vapors emanating from inside the engine during engine off soaks must pass before reaching the surrounding environment. Although the flow through trap is generally more efficient at reducing the amount of hydrocarbon vapors emitted to the environment, the by pass trap also does reduce the release of such vapors and may be used alone or in combination with one or more flow through traps and/or by pass traps. Although described herein as a flow-through trap, it should be appreciated that the trap as disclosed may also be used as a by pass trap.

During engine off, evaporative emissions may migrate or diffuse through the air intake system. The escape of the hydrocarbons from the air induction system may result in such hydrocarbons being released into the surrounding environment. For example, the unburned hydrocarbon fuel vapors may migrate from the engine as indicated at 170 or from the PCV fresh air port 166, (flow indicated at 172) back through the flow through hydrocarbon trap 162 and/or the by-pass hydrocarbon trap 160. Non-adsorbed emissions may flow through the air box 154, the dirty air duct 152, and/or the water drain 174. By using the hydrocarbon trap described herein, the amount of hydrocarbons released to the surrounding environment or atmosphere can be substantially reduced or eliminated.

As described in more detail below, the hydrocarbon trap is described as an adsorbing trap, such that the trap is adapted to collect and adhere hydrocarbon gases, such as the "light ends" of gasoline, on the surface of the adsorbing material in the trap. These "light ends" of gasoline have been found to be one of the primary constituents of the vapors emanating from a typical air induction system during engine off soaks. Although described as an adsorbing trap, in some examples, different absorbing materials, where gases are collected by full assimilation or incorporation, may also be incorporated as part of the hydrocarbon trap.

Referring again to FIG. 2, the hydrocarbon trap may be disposed in any suitable location in the air intake or air induction system. For example, as shown, the hydrocarbon trap may be disposed in the clean air duct 156 on the engine side of the MAF sensor 164. In such examples, the hydrocarbon trap may have little effect on the sensor signal. Further, in some examples, the hydrocarbon trap may be disposed at least some distance, not directly adjacent to, the PCV fresh air port 166. For example, the hydrocarbon trap may be disposed before the PCV fresh air port, at a distance (e.g. more than 2 inches), such that any engine oil that may be pushed into the clean air duct during low engine vacuum operating conditions will not leak onto or otherwise contaminate the hydrocarbon trap.

In other example systems, the hydrocarbon trap may be disposed in the air box cover 153. Positioning of the hydrocarbon trap in the air box cover may depend on whether there is enough space 159 beyond the MAF sensor to accommodate the trap. In other examples, the hydrocarbon trap may be positioned before the MAF sensor. In even other examples, where the PCV fresh air port is separate from the main inlet air filtration system, i.e. uses a separate air filtration system, the hydrocarbon trap may be disposed anywhere between the MAF sensor and the throttle plate. In even further examples, the hydrocarbon trap may be disposed within the engine intake manifold, a resonator, etc.

Figure 3:
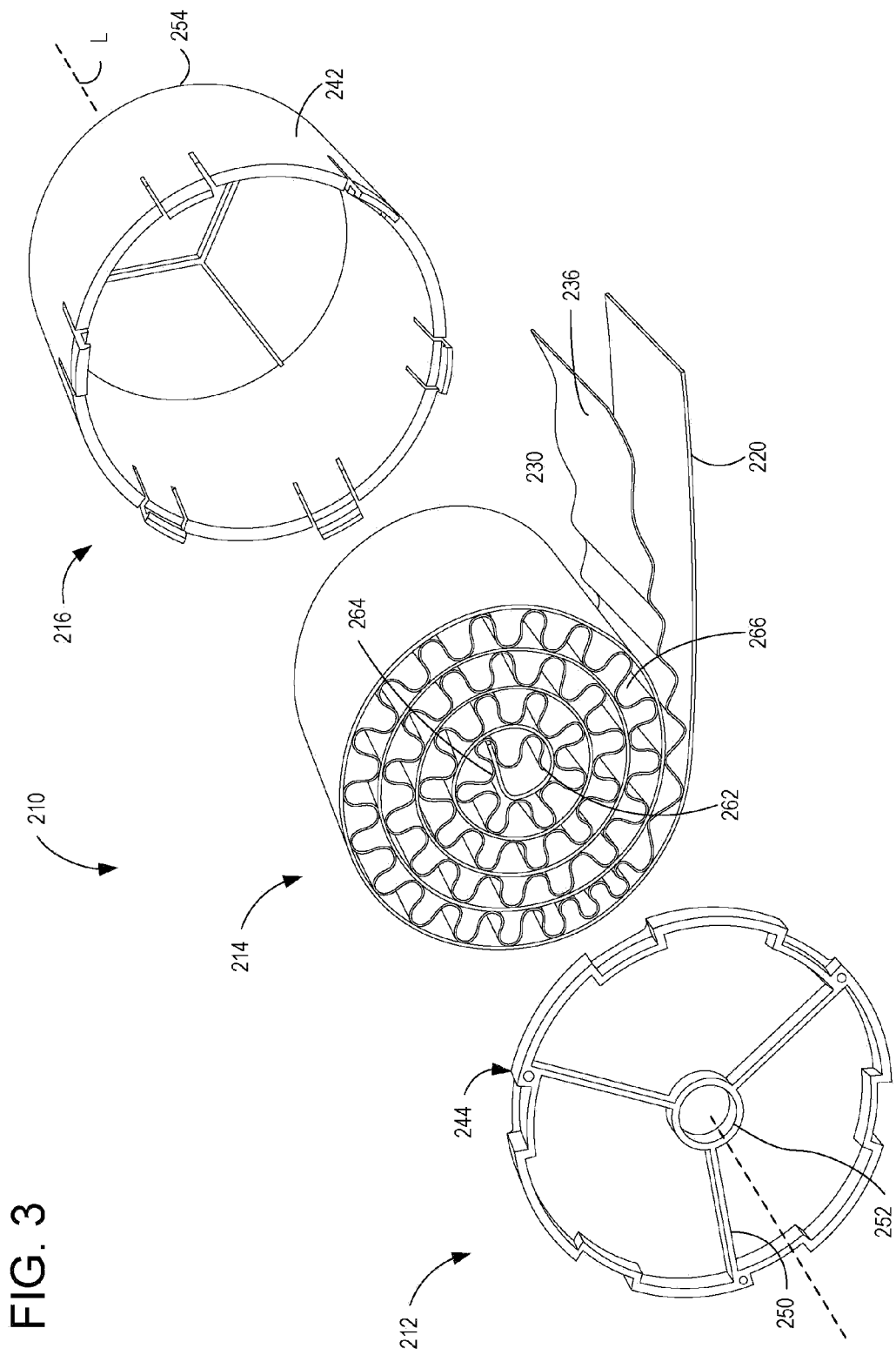
FIG. 3 is an exploded view of an AIS hydrocarbon trap including a trap housing, housing cap, and an adsorber roll including a hydrocarbon adsorbing material and a corrugate support.

Referring now to FIG. 3, a hydrocarbon trap 210 is shown in an exploded view. The hydrocarbon trap may be positioned in the intake stream of an engine system, for example engine 10. As an example, an AIS hydrocarbon trap may be disposed upstream or coupled upstream of an intake passageway, for example passage 42. Additional examples of locations for the hydrocarbon trap are described above in regards to FIG. 2.

The hydrocarbon trap 210 may include a housing cap 212, an adsorber roll 214 and a trap housing 216. The adsorber roll may be a multi-layered winding structure having along a longitudinal axis L about which the structure is wound. Specifically, as described in more detail below, adsorber roll 214 may include a layered roll of adsorbing material 220, which may be a first layer, and corrugate support 230 which may be a second layer. The adsorbing material 220 and corrugate support 230 may be wound in a continuous spiral and positioned inside the trap housing. The wound adsorber roll may take the form of a volute or spiral shape with alternating layers of corrugate support and adsorber material. The corrugate support may provide the structural support for the adsorbing material and provide spacing to enable air to flow through the hydrocarbon trap.

The corrugate support and adsorbing material may form adsorbing channels, running parallel along an air flow axis, perpendicular to the radial and/or the azimuthal axes. Such adsorbing channels may be longitudinal passages which enable air to flow through the hydrocarbon trap. As engine off soak occurs, hydrocarbons, for example fuel vaporized from the engine, may flow though the intake and into the trap. The adsorbing material may adsorb hydrocarbons and may further store hydrocarbons until release of the hydrocarbons, to regenerate the adsorber. For example, the hydrocarbons may be released from the adsorbing material through air flow over the adsorbing material and/or through heating. For example, air flow through the trap may release the hydrocarbons from the adsorbing material. Further, as another example, the adsorbing material may be heated to a deadsorbing temperature at which point the hydrocarbons may be released from the adsorbing material. Thus, the adsorbing material may be regenerated. Hydrocarbons released from the hydrocarbon trap may then be taken in by the engine for use in combustion during engine operation, such as engine start up. In alternate examples, the adsorbing material may store hydrocarbons until the adsorbing material is replaced or regenerated in another way.

Although disclosed where the corrugate support and adsorbing material are wound to form a roll, it should be appreciated that in some examples the corrugate support and adsorbing material may be layered or extended such that the long axes is in the same plane of the trap. For example, such a configuration may be used with a bypass trap.

The adsorbing material 220 is shown as a partially rolled-up sheet. Unrolled, the adsorbing material may be a single planar sheet. In some examples, the flat sheet of adsorbing material may collapse as a standalone structure. Thus, additional structure may be used to enable the adsorbing material to retain shape. As discussed below, the corrugate support may provide structural support for the adsorbing material.

The adsorbing material may be composed of a hydrocarbon adsorbing material, for example, the adsorbing material may be "carbon paper," carbon coated foam or Zeolite coated/impregnated paper. The adsorbing material adsorbs hydrocarbons for storage during engine off soak period and releases the hydrocarbons for consumption by the engine during engine running periods. In some examples, the adsorbing material may be composed of a foam and/or paper treated with a wash, a coating or resin. Example treatments and materials include carbon coating on a foam, zeolite coating on a metallic substrate, a ceramic substrate, or other similar hydrocarbon adsorbing material. The adsorbing material may be treated on a single side or on both sides. Further the adsorbing material may be a single ply material or may be layered. For example, the adsorbing material maybe a multiple ply sheet. Thus, in some examples, the adsorbing material may be single or double sided, and include any hydrocarbon adsorbing material depending on the use and application for the AIS hydrocarbon trap.

In some examples, the adsorbing material may be substantially smooth, while in other examples, the adsorbing material may be perforated or fibrous. In still further examples, the adsorbing material may include raised bumps or other structures to increase adsorbing surface area and/or to decrease any drag effects on intake air.

As described above, the adsorbing material 220 may be rolled with a corrugate support 230. The corrugate support may include an undulating shape, such as being a sinusoidal-shaped layer such that the material is wave-like. As such, the corrugate support may include a plurality of wave structures. The wave structures may be uniform throughout a portion of the corrugate support. In other examples, the wave structures may vary throughout the corrugate support or vary in a section of the corrugate support.

Corrugate support 230 may be a single-piece plastic material to provide the support for the adsorbing material. The corrugate support may further act as a spacer, defining a separation or space between spiraled layers of adsorbing material 220, and defining adsorbing channels through the hydrocarbon trap to enable the flow of air. Although described here as a plastic material, the corrugate support may be another support material, such as, but not limited to aluminum, hardened resin, metallic materials or the like.

The sinusoidal shape of the corrugate support may separate and support the adsorbing material in a configuration which enables increased hydrocarbon adsorbtion. The sinusoidal shape may define a series of waves, with crests, troughs, and wavelengths. In some examples, the waves may be uniform throughout the corrugate support. In other systems, the waves may attenuate along the length of the corrugate support or otherwise vary in regards to the crest or trough, height or depth, or the wavelength. The wavelength may be the distance between successive crests or successive troughs. The crests, troughs, and wavelength may be the same throughout the sheet or variable depending on the application of the adsorber. In some examples, the wavelength may be used to define the surface area of adsorbing material 220 exposed in adsorbing channels available to adsorb hydrocarbons.

In some examples, the radial distance from the bottom of a trough to the top of a successive crest may define a corrugate support height. In alternate examples, the vertical distance from the bottom of a trough to the top of a successive crest may define the corrugate support height. In further examples, the corrugate support height may be twice the distance from the center of a wave to a crest. In still further examples the corrugate support height may be twice the distance from the center of a wave to the trough. Corrugate support height and wavelength may together define the dimensions of adsorbing channels. In this way, airflow restriction may be designed according to different applications, for example increasing air mass to be taken in per cycle of an engine.

In some examples, the corrugate support may include an attenuation 236 at one end of the undulating sheet. The attenuation may be a flattened wave where the wavelength increases and corrugate support height decreases over a length of the flattened wave. The attenuation may enable the adsorber roll to conform to the trap housing, for example to enable a snug fit or to include a select quantity of adsorbing channels.

In some examples, the corrugate support may feature a center stopping cut 262 at one end of the undulating sheet. In some examples, the center stopping cut may be placed at a crest, a trough, or position between the crest and the trough. The center stopping cut may be chosen to determine the length of the corrugate support. The corrugate support length may be determined by one of, or a combination of the following: the length of the adsorbing material, a trap housing diameter and a trap housing shape, a density of adsorbing channels, a select wavelength, a select corrugate support height, etc. The center stopping cut may further enable a pinch 264 between two crests, two troughs or a crest and a trough. The pinch may be an area of increased pressure between two locations on the corrugate support. The pinch may be used to sandwich an ending of the adsorbing material, holding the adsorbing material in place.

The corrugate support, when unrolled, may take its shape from a molding process. In alternate examples, the corrugate support sheet may take its shape from one or more processes of mechanical deformations, heating, or alterations. In still further examples, the sheet may take its shape by a combination of mechanical deformation, heating, or alterations and molding. In this way, parameters, such as corrugate support length, width, composition, wavelength, crests, troughs, etc. may be selected in accordance with the use application.

As described above, the corrugate support 230 and adsorbing material 220 may be rolled up into a volute- or spiral-shaped adsorber roll 214. In some examples, the spiral may be a continuous spiral. In some examples, the adsorber roll may be partially shaped as an Archimedean spiral or whorl. In some examples, the corrugate support may feature a non-constant height, varying sinusoidal along the length of the undulating sheet. In this way an elliptical shaped roll may be produced. An elliptical shaped roll may conform to an elliptical shaped trap housing, or may increase adsorbing surface area.

It should be appreciated that the corrugate support and adsorbing material may both be sheets of differing chemical composition, but of the same width to form a single roll. In other embodiments the width of one of the material layers may be such that it extends beyond the other material layer.

Although discussed with a single adsorbing material layer and a single corrugate support layer, it should be appreciated that additional layers of adsorbing material or corrugate support may be included in the adsorber roll. Thus although shown where the adsorber roll includes an alternating layer of corrugate support and a layer of adsorbing material, in other examples, additional layers of corrugate support and adsorbing material may be included. Thus, in some examples, the corrugate support may support two or more adsorbing layers. The adsorbing layers may have different adsorbing properties. The number of layers of adsorbing material may be defined by the length of the adsorbing material sheet and may further enable increased adsorbing surface area.

The corrugate support and adsorbing material may be held together by frictional forces, possibly enhanced by structures in the adsorber roll, for example pinch 264, described above. In some examples, the material may be held together without additional fasteners or fastening mechanisms. However, in other examples, the corrugate support and adsorbing material may be held together by additional mechanisms, for example, by adhesive or mechanically by a fastener. It should be appreciated, that in some examples, the adsorber roll may have standalone structure and structural integrity without any additional adhesion, trap housing or supporting elements.

As described above, the layout and construction of the AIS hydrocarbon trap may enable replacement of adsorbing material and/or corrugate support. In the event that adsorbing material may become ineffective at adsorbing, due to normal wear and tear, excessive operation, or an inability to regenerate the adsorbing material, the adsorbing material may be easily replaced. In the present embodiment, an adsorber roll may be repaired by unrolling, cleaning or replacing the adsorbing material, and rerolling the repaired or new adsorbing material with the corrugate support. Ineffective or damaged corrugate support may be replaced or repaired in a similar manner. Further, the trap housing may be replaced if necessary. Such a configuration enables ease of repair and reassembly and disassembly.

The adsorber roll, including the adsorbing material and the corrugate support, may be disposed or otherwise installed inside trap housing 216. The trap housing may be made of plastic, rubber, vinyl, aluminum, metallic materials, etc. or some combination thereof. The trap housing materials may be such that they are suitable for use in close proximity to the engine and related components and the environment that the engine is operating.

The trap housing 216 may include a rear stop 254 and walls or cylindrical tubing 242. Rear stop 254 may include ribs to retain the adsorber roll in the trap housing. A housing cap 212 may be coupled to the trap housing to complete the AIS hydrocarbon trap. Although shown with a separate housing cap, it should be appreciated that the trap housing may be a single piece or the housing cap may include side walls or cylindrical tubing. Thus, it should be appreciated that the sides may be defined from the housing cap or a combination of the front and rear stop.

The trap housing 216 and housing cap 212 may be coupled together using any suitable fastener or fastening mechanisms, including, but not limited to snap fits, screws, mechanical fasteners, bolts, staples, adhesive or like elements. In some examples, the trap housing and housing cap may be integrated into one or more parts. In some examples, the trap housing and housing cap may be screwed together or snapped together to enclose the adsorber roll to form the finished HC trap assembly. As described in more detail below, the adsorber roll may be disposed and retained in the trap housing either through a friction fit or retainment structures. The orientation of the housing cap is illustrated upstream of the trap housing in the present example, however in alternate embodiments, the orientation may be reversed.

Figure 4:
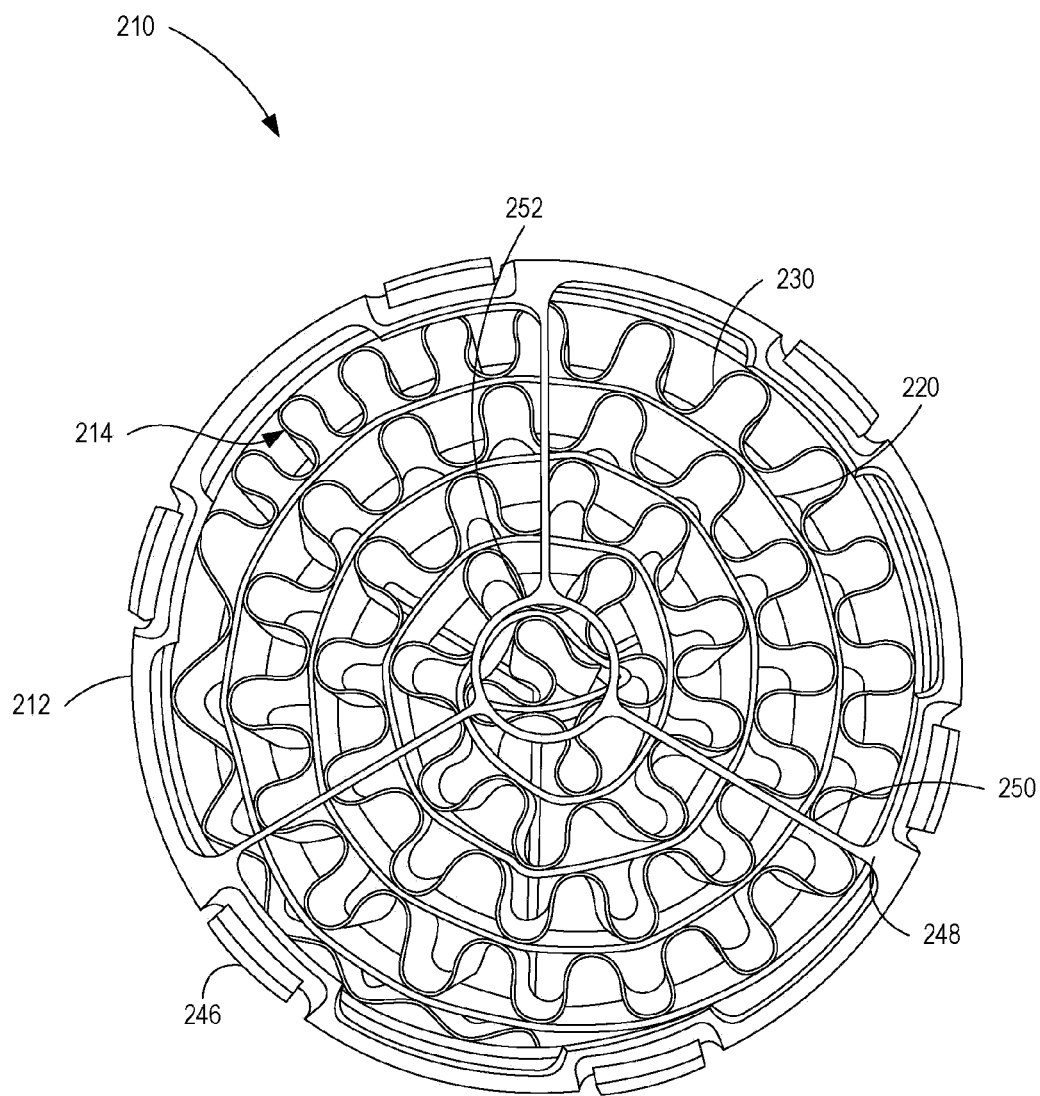
FIG. 4 is a front view of a schematic diagram of an AIS hydrocarbon trap.

Referring now to FIG. 4, a front view of a schematic diagram of an AIS hydrocarbon trap 210 is illustrated. Housing cap 212 and the trap housing may retain the adsorber roll for use as an AIS hydrocarbon trap. As discussed above, in some examples, the adsorber roll may include a layered adsorbing material 220 and corrugate support 230 rolled in a spiral shape. The corrugate support may provide support for the adsorbing material. In some examples, the corrugate support may be a single-piece sinusoidal shape plastic corrugate support.

It should be appreciated that the illustration is an example trap housing and any other housings may be used to retain the adsorber roll. As shown in FIG. 4, locking devices may be provided to secure the AIS hydrocarbon trap within the airflow path. For example, locking devices 246, such as detents, snap fit, teeth, flanges, slots, etc. may extend from the housing cap or trap housing to enable the AIS hydrocarbon trap to be secured in place, for example air box cover, clean air tube, engine intake manifold, etc.

The trap housing may include retention structure to retain the adsorber roll. For example, the housing cap may include stop flaps 248 for securing movement of the adsorber roll along the air flow axis. Stop flaps may be integrated protrusions of the housing cap, extending radially toward the center of the AIS hydrocarbon trap. The stop flaps may impede the movement of an outer corrugate support layer and/or an outer adsorbing material layer from sliding along the air flow axis.

The housing cap may also include retainment structure across the front of the housing cap. For example, retainment ribs 250 may extend across the front of the housing cap. The plurality of ribs 250 may extend form the periphery of the housing cap toward the interior of the trap housing. In additional examples, the trap housing may include a similar configuration. The retainment ribs retain the adsorber roll within the trap housing. Further, in some examples, the retainment ribs or similar structure may provide some structural support to the trap housing. The retainment ribs may be of minimal dimension to prevent air flow from being impeded.

In some examples, the retainment ribs may converge into a ring 252. The ribs may provide support for the ring. The ring may enable air to continue to flow through the center of the AIS hydrocarbon trap. Although shown with the three retainment rib and ring configuration, it should be appreciated that any other retainment structure may be used to retain the adsorber roll in the trap housing. For example, the retainment structure may include more or less retainment ribs, vertical or horizontal braces, a grid or web formation, etc.

Figure 5:
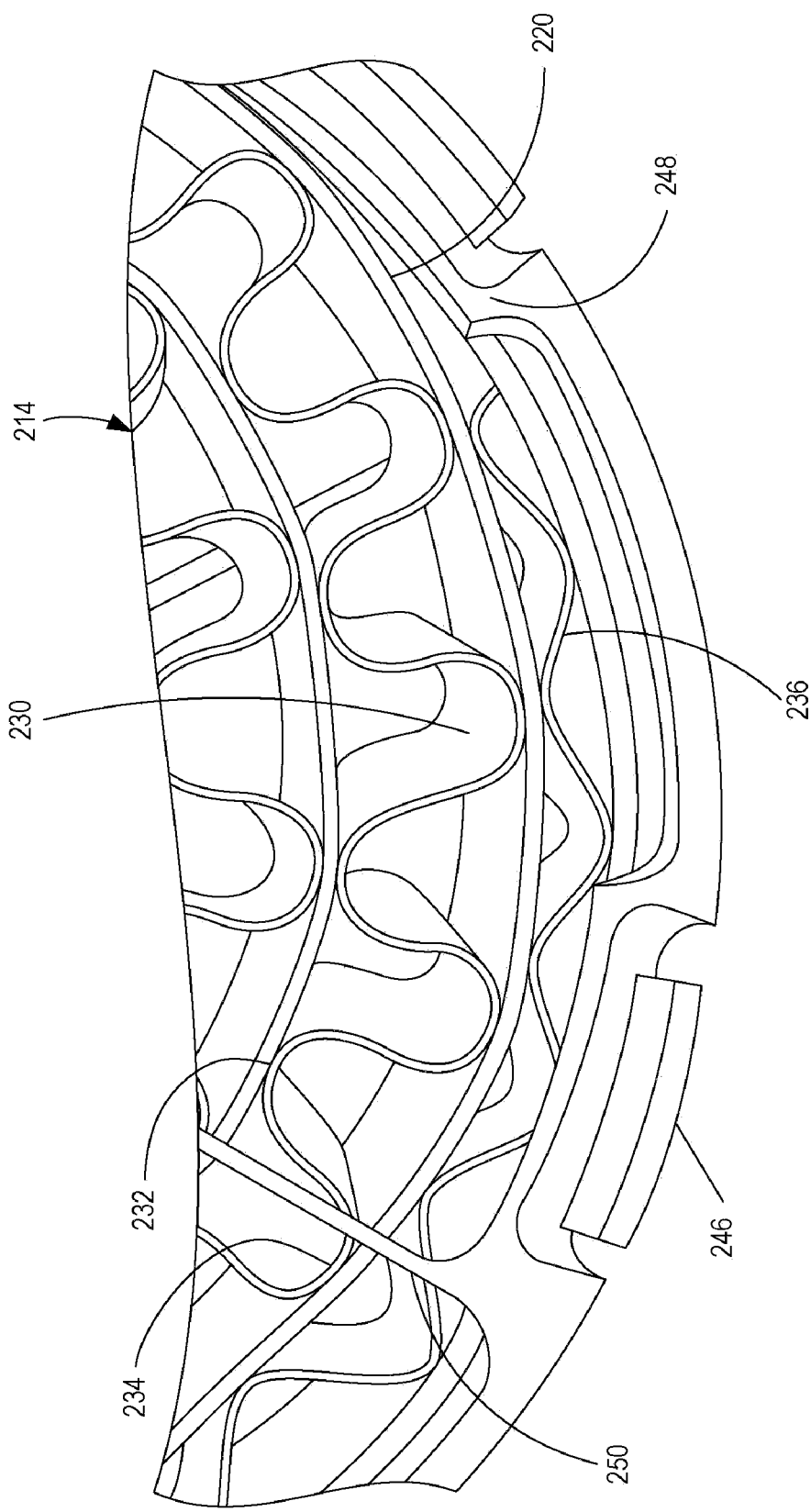
FIG. 5 is an enlarged view of an edge of the AIS hydrocarbon trap illustrated in FIG. 4.

FIG. 5 is an enlarged view of an edge of the AIS hydrocarbon trap of FIG. 4. As shown, the AIS hydrocarbon trap includes an adsorber roll, including a layered adsorbing material 220 and corrugate support 230. The corrugate support may provide the support and structure for the absorbing material. As discussed above, the corrugate support may be a single-piece sinusoidal layer which when rolled defines the spiral shaped illustrated. It is noted that the corrugate support may have an attenuation 236 at the end of the corrugate support where it abuts against the internal wall of the trap housing. The attenuation may enable the adsorber roll to conform to the trap housing's geometry.

The sinusoidal shape of the corrugate support is also illustrated in more detail in FIG. 4. The corrugate support has repeating waves with crests 232 and troughs 234. The size of the crests and troughs define the support for the adsorbing material and thus the available surface area for adsorption of hydrocarbons. Depending on the use application, the size of the waves may be varied to enable increased surface area and adsorbing channels.

Figure 6:
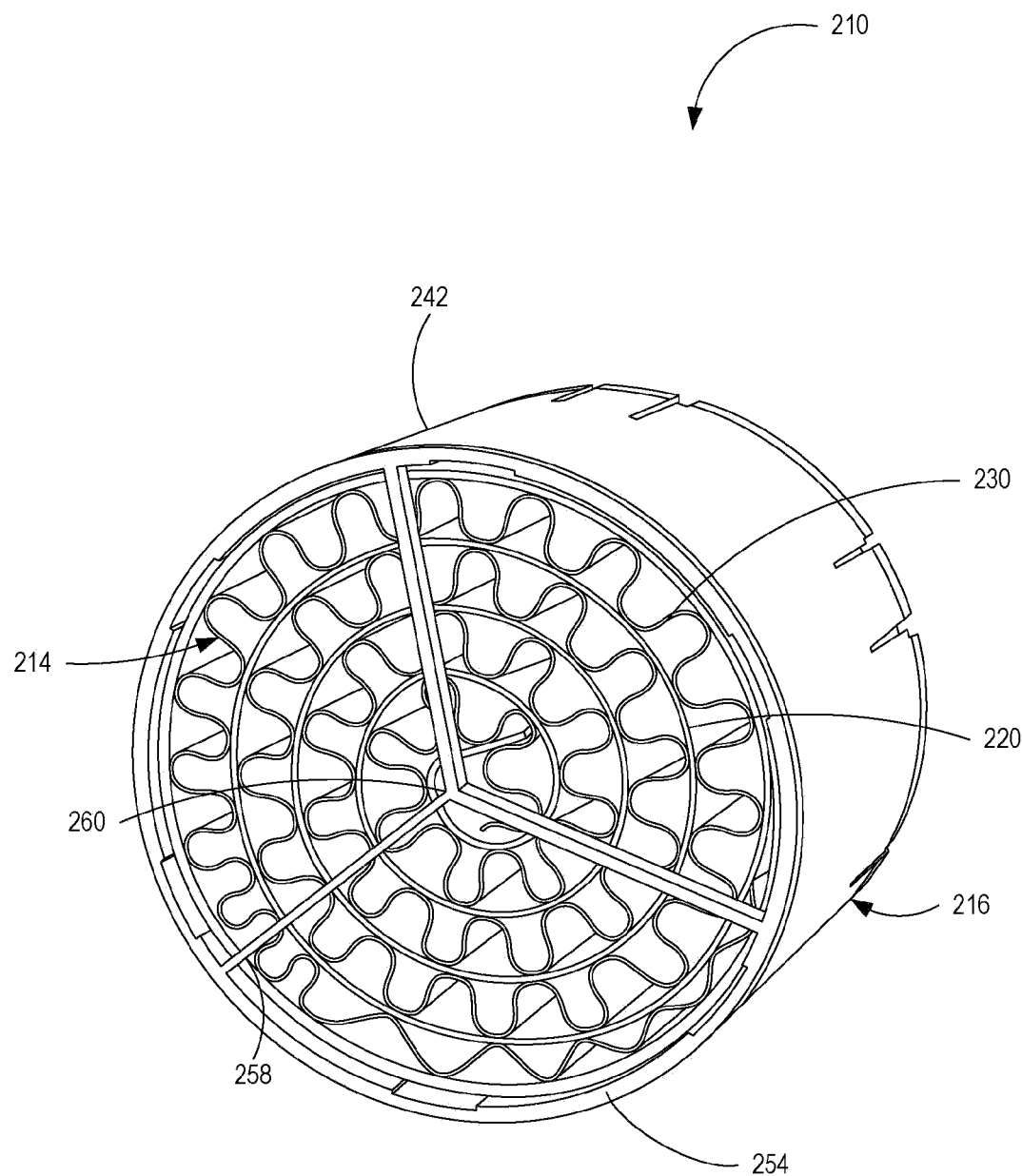
FIG. 6 is a rear perspective view of an example AIS hydrocarbon trap.

Referring now to FIG. 6, a rear perspective view of the hydrocarbon trap 210 is shown. As described above, trap housing 216 may include a rear stop 254 and side walls 242. Trap housing 216 may retain adsorber roll 214 including adsorbing material 220 and corrugate support 230. Side walls 242 may be cylindrical tubing, although other configurations are considered, rectangular, trapezoidal, etc. For example, side walls 242 may have openings or other structures to secure placement of the AIS hydrocarbon trap in the air flow path.

The trap housing may further include an integrated rear stop 254. Although discussed as an integrated cap, it should be appreciated that the rear stop may be one or more releasable components. Similar to the housing cap, the rear stop may include retainment structure across the face of the rear stop. For example, retainment ribs 258 may extend across the face of the rear stop. The retainment ribs may retain the adsorber roll within the trap housing. Further, in some examples, the retainment ribs or similar structure may provide some structural support to the trap housing. Further still, to increase structural support for the trap housing, some examples may include a rear stop featuring retainment ribs offset from retainment ribs included on the housing cap. The retainment ribs may be of minimal dimension to prevent air flow from being impeded.

In some examples, the retainment ribs may converge into a nexus 260. In other examples, a ring configuration similar to the front housing cap may be incorporated. Further, other retainment structure may be used, including configurations with more or less retainment ribs, vertical or horizontal braces, a grid or web formation, mesh netting, etc.

FIG. 7 provides a side view of the trap housing 216 and housing cap 212 of an exemplary AIS hydrocarbon trap 210. Trap housing 216 may encase the adsorber roll. As described above, locking devices may be provided within or on the trap housing and the housing cap to secure the AIS hydrocarbon trap within the airflow path. For example, locking devices 246, such as detents, snap fits, teeth, flanges, slots, etc. may extend from the housing cap or trap housing to enable the AIS hydrocarbon trap to be secured in place, for example upstream of an intake opening.

In the illustrated example, locking devices, such as locking teeth, snap fit barb slots or locking device slots are illustrated extending partially into the trap housing from the housing cap. Although shown at the housing cap end of the AIS hydrocarbon trap, the locking devices may extend from the rear stop or along any other portion of the trap housing. The locking devices may mate with corresponding structure along the intake opening.

In other examples of the AIS hydrocarbon trap, further locking devices may be included along the trap housing. For example, the trap housing may have further mounting structure on the outer side walls. Moreover, although shown as an elongated cylinder, the trap housing may be elliptical, square, rectangular, or another shape depending on the application of the AIS hydrocarbon trap. Further, corrugate support width, height, length and wavelength and adsorbing material width and length may be adaptable to the trap housing shape. Further still, multiple adsorber rolls may be placed adjacent to each other within a single trap housing or in multiple trap housings.

As described above, the AIS hydrocarbon trap with the adsorber roll including the adsorbing material and the corrugate support is configured to adsorb and store hydrocarbons that come out of the air induction system during engine off soaks and enables the hydrocarbons to be desorbed and consumed when the engine is running. The disclosed AIS hydrocarbon trap is a low-cost easily manufactured configuration which has a large adsorbing surface area for adsorption of the hydrocarbons. The structure is a light weight configuration and is easily scaled to different air induction systems. The structure further resists vacuum collapse and is easy to service and/or replace. The materials are corrosion resistant and enable the AIS hydrocarbon trap as disclosed to have an increased useful life. Further, the trap housing configuration may be adapted to indicate if there has been removal or tampering with the trap (e.g. tamper evidence).

Additionally, the AIS hydrocarbon trap may be adapted for further applications. In a first example, the AIS hydrocarbon trap comprises an absorbing material for trapping odors and other molecules and is disposed in a cabin air system. In this first example, the trap may be used in addition to a cabin air filter or in place of a cabin air filter. The inclusion of absorbing material with a multi-layered winding structure as described herein, in addition to, or instead of, adsorbing material may ensure that unpleasant odors and fumes do not enter a cabin of the vehicle receiving air through the cabin air system.

In a further second example, the AIS hydrocarbon trap of the present application may be adapted for use in a purge canister of a fuel system. A fuel system may comprise a purge canister for holding activated carbon to adsorb fuel vapors and prevent the release of the vapors into the environment. In this second example, the purge canister comprises the AIS hydrocarbon trap of the present application in addition to, or in place of, known hydrocarbon adsorbing materials and structures, such as bulk activated carbon. Further, the canister may include a purge pipe for directing vapors back into the intake manifold or engine, a fuel vapor inlet pipe, connecting the canister to a fuel tank, and an outside air pipe, for drawing in fresh air with which to purge the canister. In such a second example, the AIS hydrocarbon may be adopted for the canister such that the outside air pipe is coupled to one end of the trap and the purge pipe is at an opposite end, so that fresh air may be drawn into the canister to purge the trap. Because the trap is easily adaptable and scalable across applications, the trap may be adapted for use in the above mentioned examples as well as further automotive and combustion engine applications.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An air induction system hydrocarbon trap, comprising:
   a multi-layered structure wound around a longitudinal axis, including
   a first layer including a non-undulating adsorbing material sheet structurally supported by a second layer including an undulating, plastic, corrugate sheet, a center end of the first layer pinched by corrugates of the second layer, the first and second layers forming longitudinal passages to enable air to flow through the hydrocarbon trap; and
   a housing retaining the multi-layered structure.

2. The air induction system hydrocarbon trap of claim 1, wherein the structure is an adsorber roll being a continuous spiral including alternating layers of the first layer and the second layer, the adsorber roll having the shape of a whorl.

3. The air induction system hydrocarbon trap of claim 2, further comprising a housing cap coupled to the housing, the housing and housing cap enclosing the adsorber roll to form a trap assembly, the adsorber roll disposed and retained in the housing and the housing cap securing movement of the adsorber roll along an air flow axis.

4. The air induction system hydrocarbon trap of claim 3, further comprising:
   a locking device including at least one of a detent, a snap fit, a tooth, a flange, and a slot, the locking device integrated into an end of at least one of the housing cap and the housing, the housing further securing the trap in place within an air induction system.

5. The air induction system hydrocarbon trap of claim 3, wherein a plurality of ribs extend from the periphery of at least one of the housing cap and the housing toward the interior of the housing, the plurality of ribs supporting a ring, the ribs and ring allowing the flow of air through the trap while retaining the adsorber roll within the housing.

6. The air induction system hydrocarbon trap of claim 2, wherein a sinusoidal shape of wave structures at one end of the undulating corrugate sheet attenuate along the length of the corrugate sheet, the end of the sheet being on the exterior of the adsorber roll.

7. The air induction system hydrocarbon trap of claim 2, wherein the corrugate sheet further comprises a center stopping cut at the center end.

8. The air induction system hydrocarbon trap of claim 1, wherein the adsorbing material sheet further comprises at least one of a paper including a hydrocarbon adsorbing coating, a carbon coated foam, and zeolite.

9. The air induction system hydrocarbon trap of claim 1, wherein the adsorbing material sheet is a multi ply material, and wherein the corrugate sheet pinches the first layer at the center end between two adjacent corrugate peaks, and wherein the multi-layered structure is continuously wound more than twice around the longitudinal axis.

10. An air induction system for an engine comprising:
    an air filter box;
    a clean air duct coupled downstream from the air filter box in a direction of engine air flow during engine operation; and
    a hydrocarbon trap disposed in the clean air duct between the air filter box and a throttle body in the clean air duct, the hydrocarbon trap further comprising:
    an adsorber roll being a continuous spiral including alternating layers of a corrugate support and an adsorbing material, the adsorber roll having the shape of a whorl, a center end of the adsorbing material pinched by adjacent peaks of corrugates of the second layer;
    a housing, cylindrically shaped and retaining the adsorber roll; and
    a housing cap coupled to the housing, the housing cap securing movement of the adsorber roll along an air flow axis, and the housing and housing cap enclosing the adsorber roll.

11. The air induction system of claim 10, wherein the adsorbing material is a single sheet and the corrugate support is a single sheet of plastic comprising a plurality of wave structures having a sinusoidal shape and providing structural support for the adsorbing material and further providing spacing to enable air to flow through the hydrocarbon trap.

12. The air induction system of claim 10, wherein the hydrocarbon trap is disposed between the air filter box, and a mass air flow sensor.

13. The air induction system of claim 10, wherein the hydrocarbon trap further comprises a locking device including at least one of a detent, a snap fit, a tooth, a flange, and a slot, the locking device integrated into an end of at least one of the housing cap and the housing, the locking device further securing the trap in place within the air induction system.

14. The air induction system of claim 10, wherein the hydrocarbon trap is disposed downstream from a mass air filter in a direction of engine airflow during engine operation.

15. The air induction system of claim 10, further comprising at least one of a positive crankcase ventilation (PCV) fresh air port, a fuel vapor purge port, and a brake aspiration port, the ports coupled to the clean air duct between the throttle body and the hydrocarbon trap.

16. The air induction system of claim 15, wherein the at least one of the (PCV) fresh air port and the brake aspiration port are separated by a distance of two or more inches along the clean air duct from the hydrocarbon trap.

17. The air induction system of claim 10 further comprising at least one of a bypass hydrocarbon trap and a flow through hydrocarbon trap disposed in either the clean air duct or the air filter box.

18. A wound hydrocarbon trap, disposed within an air induction system, the trap comprising:

a multi-layered winding structure having a longitudinal axis about which the structure is wound continuously more than twice, including:
  a first layer including a non-undulating sheet of an adsorbing material, further, the adsorbing layer when in an unrolled state being a single planar sheet, the adsorbing material comprising at least one of a paper including a hydrocarbon adsorbing coating, a carbon coated foam, and zeolite; and
  a second layer structurally supporting the first layer, the second layer including an undulating, plastic, corrugate sheet comprising a plurality of wave structures having a sinusoidal shape, the first and second layers forming longitudinal passages to enable air to flow through the hydrocarbon trap, a center end of the first layer pinched by corrugates of the second layer, and an outer end of the second layer including an attenuation in the wave structure's sinusoidal shape;
  a housing retaining the multi-layered winding structure, where the outer end of the second layer abuts against an internal wall of the housing; and
  a housing cap coupled to the housing, the housing and housing cap enclosing the winding structure to form a trap assembly, the housing cap securing movement of the winding structure along an axis parallel to the longitudinal axis.

19. The wound hydrocarbon trap of claim 18, further comprising a locking device extending from at least one of the housing cap and the housing to enable the trap to be secured in place within an air induction system.

20. The wound hydrocarbon trap of claim 18, wherein the adsorbing material is a multi ply material.

\* \* \* \* \*